United States Patent [19]
Marisetty

[11] Patent Number: 5,369,651
[45] Date of Patent: Nov. 29, 1994

[54] MULTIPLEXED BYTE ENABLE BUS FOR PARTIAL WORD WRITES TO ECC PROTECTED MEMORY

[75] Inventor: Suresh K. Marisetty, San Jose, Calif.

[73] Assignee: Intel Corporation, Santa Clara, Calif.

[21] Appl. No.: 906,693

[22] Filed: Jun. 30, 1992

[51] Int. Cl.[5] ...................... G06F 12/04; G06F 11/10
[52] U.S. Cl. ................................. 371/40.1; 395/425
[58] Field of Search ...................... 371/40.1; 395/425

[56] References Cited

U.S. PATENT DOCUMENTS

| | | | |
|---|---|---|---|
| 3,573,728 | 4/1971 | Kolankowski | 371/40.1 |
| 4,204,634 | 5/1980 | Barsuhn | 371/40.1 |
| 4,520,439 | 5/1985 | Liepa | 395/425 |
| 5,048,022 | 9/1991 | Bissett et al. | 371/40.1 |
| 5,247,644 | 9/1993 | Johnson et al. | 395/425 |
| 5,276,832 | 1/1994 | Holman, Jr. | 395/425 |

*Primary Examiner*—Stephen M. Baker
*Attorney, Agent, or Firm*—Blakely, Sokoloff, Taylor & Zafman

[57] ABSTRACT

The present invention discloses a method and apparatus for minimizing the number of pins required in a memory system for support of partial word write operations to an ECC protected memory array. A memory system is provided having a memory controller which is coupled to a system bus via a first control bus and to an ECC protected memory array via a second control bus. The memory system also includes a data path buffer which is similarly connected to the system bus via a first data bus and to the memory array via a second data bus. Furthermore, a first control bus is coupled between the memory controller and the data path buffer. A byte enable bus is provided for transmitting eight byte enable signals therebetween. A multiplexor and a demultiplexor are arranged at the respective ends of the byte enable bus for multiplexing and demultiplexing the signals as they are transmitted. Upon transmission of the multiplexed signals from the memory controller to the data path buffer, the data bytes of a data string are merged with corresponding data bytes of a memory string to form a modified memory string. In the memory system of the present invention, only two (multiplexed) byte enable lines are required to transmit the eight byte enable signals required to perform the merge operation.

24 Claims, 1 Drawing Sheet

MULTIPLEXED BYTE ENABLE BUS FOR PARTIAL WORD WRITES TO ECC PROTECTED MEMORY

BACKGROUND OF THE INVENTION (1) Field of the Invention

The present invention relates to the field of computer multiprocessor system architecture, particularly the field of memory systems having error correction code protected memory.

(2) Prior Art

In the design of a multiprocessor system architecture, a memory system is connected to a system bus for storing data generated and used by a plurality of input/output devices similarly connected to the bus. A central processing unit (CPU) controls the flow of data on the bus by reading the data generated by an input device and writing the data to either an output device or to memory. Data is stored in a memory array through the use of a memory system in which a memory controller controls the flow of data on a data path connected between the system bus and a memory array. When the CPU initiates a write cycle to write data to the memory array, it generates address and control signals, hereinafter referred to as instructions, and a plurality of byte enable signals which are transmitted to the memory controller to designate specific data strings and the specific locations where those data strings are to be stored. In response, the memory controller of a prior art memory system transmits the byte enable signals to the data path via a byte enable bus having a corresponding number of byte enable lines so as to permit the passage of selected data strings placed on the data path to the memory array.

In computers using error correction code (ECC) protected memory arrays, data strings stored in the memory array, hereinafter called memory strings, are protected by ECC codes so as to maintain data consistency and prevent erroneous overwriting of data. The ECC codes are generated by a coding means in the data path and are connected to the data strings while the data strings are temporarily stored in a data path buffer. The data strings and their associated codes are subsequently transferred to the memory array for storage as memory strings and associated codes. During a normal full word write operation, the CPU instructs the memory controller to write into memory the entire data string placed in the data path buffer. When a full word write occurs, the memory controller instructs the coding means to generate an ECC code for the data string currently stored in the data path buffer and sends high (or active) all byte enable lines corresponding to each byte of the data string in order to designate that the entire data string is to be written into the memory array along with the ECC code.

In order to update the memory strings stored in the memory array with new data, the CPU generates a partial word write operation which triggers a read-modify-write operation. The memory controller instructs the data path to read a specific memory word from the memory array and store it in the data path buffer. Next, the memory controller instructs the data path to read a selected data string from the system bus and to save the data string in the data path buffer. The data bytes of the memory string to be saved are merged with new data bytes of the data string by overwriting only those data bytes of the memory string which correspond to low (or inactive) byte enable signals. A new ECC code is generated for the modified memory string and the combination is then written back into the memory array.

In prior art memory systems using ECC protected memory, the memory controller and data path buffer each comprise a plurality of byte enable pins for transmitting a corresponding number of byte enable signals along a byte enable bus. As mentioned above, the purpose of the plurality of byte enable signals is to designate which bytes of the memory string, corresponding to specific byte enable signals, are to be protected during the overwrite with the new data bytes to obtain the modified word in a partial word write operation. The problem with the above method is that in order to support a partial word write operation to an ECC protected memory array, the total number of input/output pins required to convey the byte enable information between the memory controller and the data path buffer corresponds to twice the number of data bytes in a memory string. In most prior art memory systems, the memory strings comprise eight data bytes so that eight pins are required for each of the memory controller and the data path buffer. This is a problem with most memory system designs which are pin bound since it is obviously desirable to minimize the number of pins needed to support the seldom utilized partial word write operation. With the number of input/output pins minimized, the multiprocessor system architecture may then be incorporated into smaller and cheaper integrated circuit packages. Furthermore, through the use of a multiplexed byte enable bus, other memory system operations may be facilitated due to the fact that the same multiplexed bus can be used to transmit other information and signals between the memory controller and the data path buffer.

It is therefore an object of the present invention to provide a method and an apparatus for minimizing the number of pins required in a memory system for support of partial word write operations to an ECC protected memory array with no resulting performance penalty.

It is a further object of the present invention to provide a design for a memory system using eight byte memory strings and requiring four clocks per memory read in which only two byte enable signals are required to support partial word write operations.

Yet another object of the invention is to provide a method and apparatus for a multiplexed byte enable bus in which the maximum efficient use of the memory controller and data path of a memory system can be achieved.

SUMMARY OF THE INVENTION

The present invention discloses a method and apparatus for minimizing the number of pins required in a memory system for support of partial word write operations to an ECC protected memory array. A memory system is provided having a memory controller which is coupled to a system bus via a first control bus and to an ECC protected memory array via a second control bus. The memory system also includes a data path buffer which is similarly connected to the system bus via a first data bus and to the memory array via a second data bus. Furthermore, a first control bus is coupled between the memory controller and the data path buffer.

To minimize the number of pins required by the memory controller and the data path buffer, a byte enable bus is provided for transmitting multiplexed signals therebetween. A multiplexor and a demultiplexor are arranged at the respective ends of the byte enable bus for multiplexing and demultiplexing the signals as they are transmitted. Upon transmission of the multiplexed signals to the data path buffer, the data bytes of a data string are merged with corresponding data bytes of a memory string to form a modified memory string. After the merge occurs, the memory controller instructs a coding means to generate a new ECC code associated with the resulting modified memory string, and the combination is transmitted back to the memory array via the second data bus for storage.

So as to prevent the demultiplexor from reading incorrect or invalid information on the byte enable bus, a validation signal is also transmitted via the byte enable bus for validating the multiplexed signals transmitted by the multiplexor.

In the memory system of the present invention, four clocks are required to perform a memory read operation. In addition, the memory system is adapted to use memory strings having eight data bytes. Therefore, a memory system of this type requires eight byte enable signals to perform the merge or modify operation and only two (multiplexed) byte enable lines for transmitting these byte enable signals to the data path buffer. In this manner, the preferred embodiment of the present invention requires only three pins for each of the memory controller and the data path buffer for connection to the byte enable bus in order to transmit the two multiplexed signals and the validation signal.

BRIEF DESCRIPTION OF THE DRAWINGS

The objects, features and advantages of the present invention will become apparent from the following detailed description of the preferred embodiment in which.

DETAILED DESCRIPTION OF THE INVENTION

Figure 1:
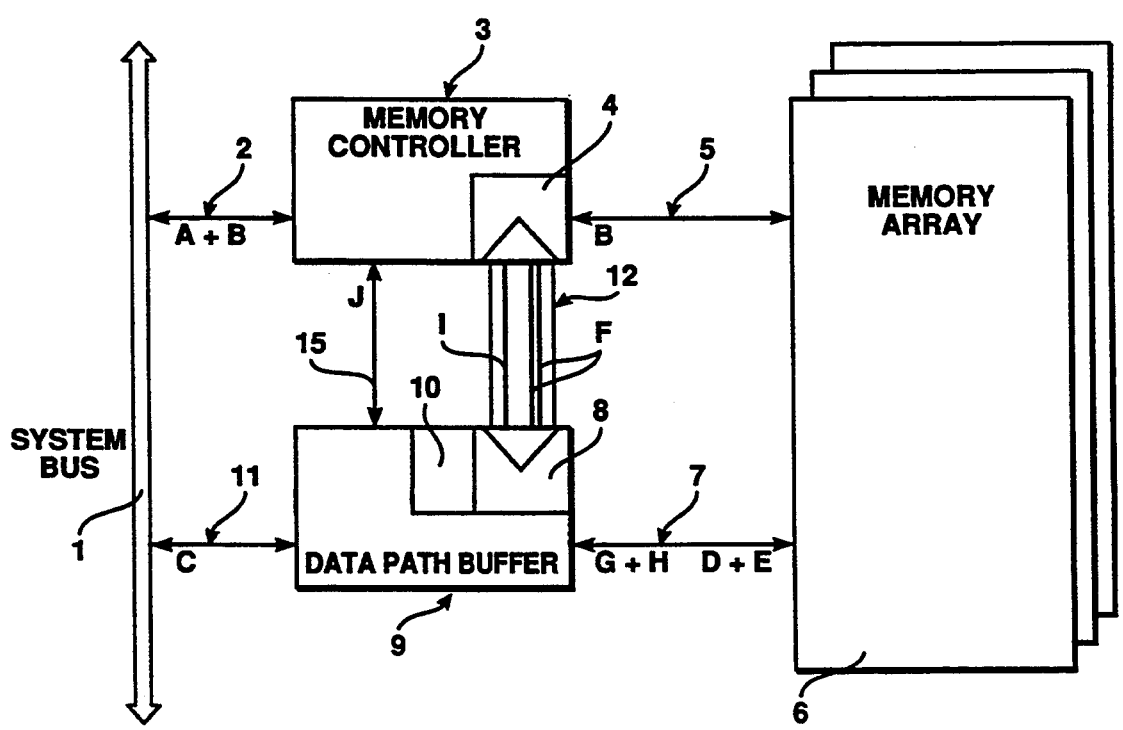
FIG. 1 is a block diagram of the present invention showing the multiplexed byte enable bus in detail.

A method and apparatus for minimizing the number of pins required in a memory system for support of partial word write operations on an ECC protected memory array 6 is described. In the following description, numerous specific details are set forth such as specific memories, organizations, architectures, data rates, etc. in order to provide a thorough understanding of the present invention. It will be obvious, however, to one skilled in the art that these details are not required to practice the present invention. In other instances, well-known circuits, architectures, methods and the like are not set forth in detail in order to avoid unnecessarily obscuring the present invention.

As shown in the block diagram of FIG. 1, the present invention provides a memory system having a memory controller 3 coupled to a system bus 1 via a first control bus 2 for receiving and transmitting a predetermined number of byte enable signals A and instructions B comprising address locations and control signals. The memory controller 3 is also coupled to an ECC protected memory array 6 via a second control bus 5 for transmitting the instructions B to the memory array 6. A data path buffer 9 is further provided which is connected to the system bus 1 via a first data bus 11 for receiving data strings C. The data path buffer 9 is similarly coupled to the memory array 6 via a second data bus 7 for receiving and transmitting memory strings D and associated ECC codes E.

In carrying out a partial word write operation, the memory controller 3 transmits appropriate instructions J via a third control bus 15 to the data path buffer 9 to instruct it to select a specific memory string D and its associated code E from the memory array 6 and store them in the data path buffer 9. The memory controller 3 also instructs the data path buffer 9 to select a data string C placed on the system bus 1 and to store it in the data path buffer 9. In order to correctly modify the selected memory string D with the proper data bytes of the data string C, the memory controller 3 transmits the predetermined number of byte enable signals A in the form of a predetermined number of multiplexed signals F via a byte enable bus 12 to the data path buffer 9. The predetermined number of byte enable signals A, which correspond to specific data bytes of the memory string D, are either high or low (active or inactive) depending upon which data bytes in the memory string D are to be overwritten. If a particular byte enable signal is high, the corresponding data byte in the memory string D will not be overwritten. On the other hand, if a particular byte enable signal is low, the corresponding data byte in the memory string D will be overwritten with a corresponding data byte of the data string C.

In order to minimize the number of pins required by each of the memory controller 3 and the data path buffer 9, the present invention further provides a multiplexor 4 for multiplexing the predetermined number of byte enable signals A into a predetermined number of multiplexed signals F before they are transmitted via the byte enable bus 12 to the data path buffer 9. At the other end of the byte enable bus 12, a demultiplexor 8 is provided for demultiplexing the multiplexed signals F before they are utilized by the data path buffer 9 in overwriting corresponding data bytes of the selected memory string D. Once the multiplexed signals F are demultiplexed by the demultiplexor 8, the predetermined number of byte enable signals A are used to form the modified memory string G. After the overwrite occurs, the memory controller 3 then instructs a coding means 10 to generate a new associated code H corresponding to the resulting modified memory string G. Finally, both the modified memory string G and its associated code H is transmitted back to the memory array 6 via the second data bus 7 to store them for later use.

So as to prevent the demultiplexor 8 from reading incorrect or invalid information on the byte enable bus 12, a validation signal I is also transmitted via the byte enable bus 12 for validating the multiplexed signals F transmitted by the multiplexor 4. Therefore, the demultiplexor 8 will only read the multiplexed signals F on the byte enable bus 12 when the validation signal I is sent low (or inactive).

In the preferred embodiment of the present invention, the multiplexor 4 and the demultiplexor 8 actually form a part of the memory controller 3 and the data path buffer 9, respectively. Similarly, the coding means 10 is arranged within the data path buffer 9. Furthermore, the memory system of the present invention requires four clocks to perform a memory read operation and is adapted for use with memory strings D having eight data bytes. Therefore, eight byte enable signals are required to perform the modify operation since any or all of the eight bytes of the memory string D may be overwritten with the data bytes of the data string C. With a system set up as such, the minimum number of multiplexed signals F required is eight divided by four, or two multiplexed signals F. In this manner, the preferred embodiment of the present invention requires only three pins for each of the memory controller 3 and the data path buffer 9 for connection to the byte enable bus 12 in order to transmit the two multiplexed signals F and the validation signal I.

The present invention, however, may be generalized for application to any ECC protected memory system requiring a different number of clocks to perform a memory read and utilizing memory strings D of varying lengths. By representing the number of clocks needed for a memory read with K and the number of bytes in a memory string with N, the minimum size M of the byte enable bus 12 can be determined by calculating $M=(N/K)+1$. Although the use of a multiplexed bus 12 normally deteriorates the performance of devices using the bus due to the significantly longer time required to multiplex and demultiplex the information transmitted on the bus, the present invention avoids any performance penalty by configuring the size of the bus 12 in terms of memory read latencies. Hence, while the present invention has been described in conjunction with the preferred embodiment, it is evident that numerous alternatives, depictions, variations and uses will be apparent to those skilled in the art in light of the foregoing description.

I claim:

1. A memory system for performing partial word write operations to an error correction code protected memory array, said memory system coupled to a system bus for receiving and transmitting instructions, data strings and a predetermined number of byte enable signals, said byte enable signals corresponding to specific data bytes of memory strings stored in said memory array, said partial word write operations performed by overwriting data bytes of said memory strings corresponding to low byte enable signals with corresponding data bytes of said data strings to form new memory strings and generating new codes associated with said new memory strings, said memory system comprising:
   memory control means coupled to said system bus and further coupled to said memory array;
   buffer means coupled to said system bus and further coupled to said memory array;
   multiplexing means adapted to receive and multiplex said predetermined number of byte enable signals into a predetermined number of multiplexed signals;
   demultiplexing means adapted to receive and demultiplex said predetermined number of multiplexed signals into said predetermined number of byte enable signals;
   a first transfer means for transmitting control signals between said memory control means and said buffer means; and
   a second transfer means for transmitting said predetermined number of multiplexed signals from said multiplexing means to said demultiplexing means.

2. The system of claim 1, wherein said multiplexing means forms a part of said memory control means and said demultiplexing means forms a part of said buffer means.

3. The system of claim 1, wherein said second transfer means further transmits at least a first validation signal to validate said predetermined number of multiplexed signals transmitted on said second transfer means.

4. The system of claim 1, wherein said system further comprises coding means for generating said new codes associated with said new memory strings.

5. The system of claim 4 wherein said system further comprises a third transfer means for transmitting said new memory strings and said new associated codes to said memory array.

6. The system of claim 1, wherein said system requires C clocks to perform a memory read operation, said memory strings comprise N data bytes, said predetermined number of byte enable signals comprises N byte enable signals and said predetermined number of multiplexed signals comprises at least N/C multiplexed signals.

7. The system of claim 6, wherein said system requires 4 clocks to perform a memory read operation, said memory strings comprise 8 data bytes, said predetermined number of byte enable signals comprises 8 byte enable signals and said predetermined number of multiplexed signals comprises at least 2 multiplexed signals.

8. A memory system for performing partial word write operations to an error correction code protected memory array, said memory system coupled to a system bus for receiving and transmitting instructions, data strings and a predetermined number of byte enable signals, said byte enable signals corresponding to specific data bytes of memory strings stored in said memory array, said partial word write operations performed by overwriting data bytes of said memory strings corresponding to low byte enable signals with corresponding data bytes of said data strings to form new memory strings and generating new codes associated with said new memory strings, said memory system comprising:
   memory control means for receiving said instructions and said predetermined number of byte enable signals from said system bus, said memory control means transmitting said instructions to said memory array to select a first memory string and a first associated code and multiplexing said predetermined number of byte enable signals into a predetermined number of multiplexed signals;
   buffer means for receiving said first memory string and said first associated code from said memory array to temporarily store said memory string and said associated code, said buffer means receiving a data string from said system bus to temporarily store said data string and demultiplexing said predetermined number of multiplexed signals into said predetermined number of byte enable signals;
   a first transfer means for transmitting control signals between said memory control means and said buffer means; and
   a second transfer means for transmitting said predetermined number of multiplexed signals from said memory control means to said buffer means.

9. The system of claim 8, wherein said system further comprises coding means for generating said new codes associated with said new memory strings.

10. The system of claim 8, wherein said system further comprises a third transfer means for transmitting said new memory strings and said new associated codes to said memory array.

11. The system of claim 8, wherein said second transfer means further transmits at least a first validation signal to validate said predetermined number of multiplexed signals transmitted on said second transfer means.

12. The system of claim 8, wherein said system requires C clocks to perform a memory read operation, said memory strings comprise N data bytes, said predetermined number of byte enable signals comprises N byte enable signals and said predetermined number of multiplexed signals comprises at least N/C multiplexed signals.

13. The system of claim 12, wherein said system requires 4 clocks to perform a memory read operation, said memory strings comprise 8 data bytes, said predetermined number of byte enable signals comprises 8 byte enable signals and said predetermined number of multiplexed signals comprises at least 2 multiplexed signals.

14. A method for performing partial word write operations in an error correction code protected memory system, said memory system coupled to a system bus for receiving and transmitting instructions, data strings and a predetermined number of byte enable signals, said byte enable signals corresponding to specific data bytes of memory strings stored in a memory array, said method comprising the steps of:

transmitting a first memory string and a first associated code from said memory array to a buffer means to temporarily store said first memory string and said first associated code;

transmitting a data string to said buffer means to temporarily store said data string in said buffer means;

multiplexing said predetermined number of byte enable signals into a predetermined number of multiplexed signals in said memory control means;

demultiplexing said predetermined number of multiplexed signals into said predetermined number of byte enable signals in said buffer means;

overwriting data bytes of said first memory string corresponding to low byte enable signals with corresponding data bytes of said data string to form a second memory string;

generating a second associated code corresponding to said second memory string; and transmitting said second memory string and said second associated code to said memory array.

15. The method of claim 14, further comprising the step of transmitting at least a first validation signal from said memory control means to said buffer means before demultiplexing said predetermined number of multiplexed signals to validate said predetermined number of multiplexed signals.

16. The method of claim 14, wherein said partial word write operations require C clocks to perform a memory read operation, said memory strings comprise N data bytes, said predetermined number of byte enable signals comprises N byte enable signals and said predetermined number of multiplexed signals comprises at least N/C multiplexed signals.

17. The method of claim 16, wherein said partial word write operations require 4 clocks to perform a memory read operation, said memory strings comprise 8 data bytes, said predetermined number of byte enable signals comprises 8 byte enable signals and said predetermined number of multiplexed signals comprises at least 2 multiplexed signals.

18. A memory system for performing partial word write operations to an error correction code protected memory array, said memory system coupled to a system bus for receiving and transmitting instructions, data strings and a predetermined number of byte enable signals, said byte enable signals corresponding to specific data bytes of memory strings stored in said memory array, said partial word write operations performed by overwriting data bytes of said memory strings corresponding to low byte enable signals with corresponding data bytes of said data strings to form new memory strings and generating new codes associated with said new memory strings, said memory system comprising:

a memory controller coupled to said system bus and further coupled to said memory array;

a data path buffer coupled to said system bus and further coupled to said memory array;

a multiplexor adapted to receive and multiplex said predetermined number of byte enable signals into a predetermined number of multiplexed signals;

a demultiplexor adapted to receive and demultiplex said predetermined number of multiplexed signals into said predetermined number of byte enable signals;

a first control bus for transmitting control signals between said memory controller and said data path buffer; and a second control bus for transmitting said predetermined number of multiplexed signals from said multiplexor to said demultiplexor.

19. The system of claim 18, wherein said multiplexor forms a part of said memory controller and said demultiplexor forms a part of said data path buffer.

20. The system of claim 18, wherein said second control bus further transmits at least a first validation signal to validate said predetermined number of multiplexed signals transmitted on said second control bus.

21. The system of claim 18, wherein said system further comprises coding circuitry for generating said new codes associated with said new memory strings.

22. The system of claim 21, wherein said system further comprises a third control bus for transmitting said new memory strings and said new associated codes to said memory array.

23. The system of claim 18, wherein said system requires C clocks to perform a memory read operation, said memory strings comprise N data bytes, said predetermined number of byte enable signals comprises N byte enable signals and said predetermined number of multiplexed signals comprises at least N/C multiplexed signals.

24. The system of claim 23, wherein said system requires 4 clocks to perform a memory read operation, said memory strings comprise 8 data bytes, said predetermined number of byte enable signals comprises 8 byte enable signals and said predetermined number of multiplexed signals comprises at least 2 multiplexed signals.

* * * * *